(12) United States Patent
Zhao

(10) Patent No.: US 12,507,209 B2
(45) Date of Patent: Dec. 23, 2025

(54) METHOD FOR WIRELESS COMMUNICATION AND TERMINAL DEVICE

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 602 days.

(21) Appl. No.: 17/938,485

(22) Filed: Oct. 6, 2022

(65) Prior Publication Data

US 2023/0035725 A1 Feb. 2, 2023

Related U.S. Application Data

(63) Continuation of application No. PCT/CN2020/121616, filed on Oct. 16, 2020.

(51) Int. Cl.
*H04W 72/02* (2009.01)
*H04W 72/0446* (2023.01)

(52) U.S. Cl.
CPC ....... *H04W 72/02* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 12,149,367 B2* | 11/2024 | Zhou | H04L 1/1893 |
| 2018/0098323 A1 | 4/2018 | Zhang et al. | |
| 2020/0107303 A1 | 4/2020 | Hahn | |
| 2020/0403737 A1* | 12/2020 | Yeo | H04W 52/325 |
| 2022/0232620 A1* | 7/2022 | Lee | H04L 1/1867 |
| 2022/0312388 A1* | 9/2022 | Zhao | H04W 72/20 |

FOREIGN PATENT DOCUMENTS

| | | |
|---|---|---|
| CN | 110545533 | 12/2019 |
| CN | 110731117 | 1/2020 |
| CN | 111294753 | 6/2020 |

(Continued)

OTHER PUBLICATIONS

ZTE et a., "NR sidelink physical layer structure," 3GPP TSG RAN WG1 #97, R1-1906457, May 2019.

(Continued)

*Primary Examiner* — Jamaal Henson
(74) *Attorney, Agent, or Firm* — Hodgson Russ LLP

(57) ABSTRACT

Methods for wireless communication and a terminal device are provided. The method includes the following. A terminal device obtains configuration information transmitted by a network device, where the configuration information is used to configure multiple transmission resources for the terminal device, the transmission resources include multiple sidelink (SL) transmission resources, and the SL transmission resources are used for physical sidelink shared channel (PSSCH) transmission. The terminal device determines whether to perform SL transmission on part of the SL transmission resources according to a time interval between the multiple transmission resources.

14 Claims, 8 Drawing Sheets

(56) References Cited

FOREIGN PATENT DOCUMENTS

| CN | 111525987 | 8/2020 | | |
|---|---|---|---|---|
| CN | 111526598 | 8/2020 | | |
| WO | 2017031620 | 3/2017 | | |
| WO | WO-2020142940 A1 * | 7/2020 | ............ | H04W 72/23 |
| WO | 2020187281 | 9/2020 | | |
| WO | 2020191769 | 10/2020 | | |
| WO | 2020191778 | 10/2020 | | |

OTHER PUBLICATIONS

WIPO, International Search Report and Written Opinion for International Application No. PCT/CN2020/121616, Jul. 19, 2021.
EPO, Communication for EP Application No. 20957251.0, Jan. 24, 2024.
CNIPA, Second Office Action for CN Application No. 202080098534.6, Jul. 4, 2024.
Intel Corporation, "Design of Resource Allocation Mode-2 for NR V2X Sidelink Communication," 3GPP TSG RAN WG1 Meeting #99, R1-1912205, Nov. 2019.
CNIPA, Notification to Grant Patent Right for Invention for CN Application No. 202080098534.6, Sep. 11, 2024.
EPO, Extended European Search Report for EP Application No. 20957251.0, May 10, 2023.

* cited by examiner

METHOD FOR WIRELESS COMMUNICATION AND TERMINAL DEVICE

CROSS-REFERENCE TO RELATED APPLICATION(S)

This application is a continuation of International Application No. PCT/CN2020/121616, filed Oct. 16, 2020, the entire disclosure of which is hereby incorporated by reference.

TECHNICAL FIELD

The disclosure relates to the field of communication, and more particularly to methods for wireless communication and a terminal device.

BACKGROUND

Communication architectures such as device to device (D2D), vehicle to vehicle (V2V), or vehicle to everything (V2X) can achieve communication between terminal devices based on sidelink (SL) technology. Unlink a conventional cellular system in which communication data is received or transmitted through a base station, a D2D direct communication mode has higher spectrum efficiency and lower transmission latency.

Two transmission modes, i.e., a first mode and a second mode, are defined in a 3rd generation partnership project (3GPP). In the first mode, a network device allocates a transmission resource to a terminal device. In the second mode, a terminal device selects a resource for data transmission from a resource pool. In new radio (NR)-V2X, for improving reliability, SL feedback is introduced. For example, for unicast transmission, a transmitting terminal device transmits SL data to a receiving terminal device, the receiving terminal device transmits SL feedback information to the transmitting terminal device, and the transmitting terminal device determines whether to perform retransmission according to the SL feedback information of the receiving terminal device. If SL transmission resources are scheduled by a network device, i.e., in the first mode, a transmitting terminal device needs to report the SL feedback information to the network device, and the network device determines whether to allocate retransmission resources to the terminal device according to the SL feedback information reported by the terminal device. The transmitting terminal device can dynamically activate or deactivate SL feedback. However, in the first mode, the network device is not sure whether the transmitting terminal device has activated or deactivated SL feedback, and thus when the network device allocates transmission resources to the transmitting terminal device, the network device does not consider whether SL feedback is activated. However, the transmitting terminal device and the receiving terminal device need to take processing time to detect received data or prepare data to-be-transmitted, which may result in that the network device unreasonably allocates transmission resources, thereby causing that data transmission cannot be performed, and thus reducing reliability of a communication system.

SUMMARY

Methods for wireless communication and a terminal device are provided in implementations of the disclosure.

In a first aspect, a method for wireless communication is provided. The method includes the following. A terminal device obtains configuration information transmitted by a network device, where the configuration information is used to configure multiple transmission resources for the terminal device, the multiple transmission resources include multiple sidelink (SL) transmission resources, and the SL transmission resources are used for physical sidelink shared channel (PSSCH) transmission. The terminal device determines whether to perform SL transmission on part of the multiple SL transmission resources according to a time interval between the multiple transmission resources.

In a second aspect, a method for wireless communication is provided. The method includes the following. A network device transmits configuration information to a terminal device, where the configuration information is used to configure multiple transmission resources for the terminal device, the transmission resources include multiple SL transmission resources, the SL transmission resources are used for PSSCH transmission, and a time interval between the transmission resources is used by the terminal device to determine whether to perform SL transmission on part of the SL transmission resources.

In a third aspect, a terminal device is provided. The terminal device includes a transceiver, a processor, and a memory storing computer programs. The computer programs are executed by the processor to cause the transceiver to obtain configuration information transmitted by a network device, where the configuration information is used to configure multiple transmission resources for the terminal device, the multiple transmission resources include multiple SL transmission resources, and the SL transmission resources are used for PSSCH transmission. The computer programs are further executed by the processor to cause the processor to determine whether to perform SL transmission on part of the multiple SL transmission resources according to a time interval between the multiple transmission resources.

DETAILED DESCRIPTION

The following will illustrate technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Before introducing technical solutions in the disclosure, first illustrate related concepts involved in the disclosure.

1. Device to Device (D2D)/Vehicle to Everything (V2X)

D2D communication is a D2D-based sidelink (SL) transmission technology. Unlink a conventional cellular system in which communication data is received or transmitted through a base station, D2D communication has higher spectrum efficiency and lower transmission latency. An internet of vehicles (IoV) system adopts a D2D direct communication mode, and two transmission modes, i.e., a first mode and a second mode, are defined in a 3rd generation partnership project (3GPP).

Figure 1:
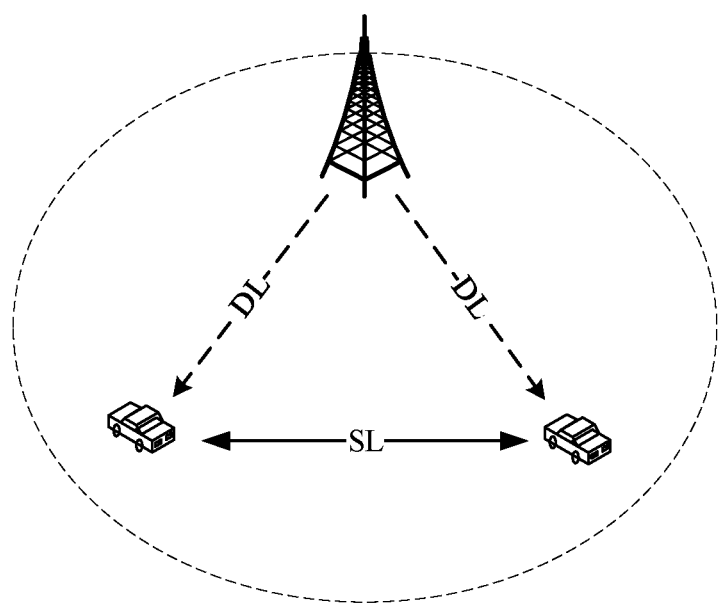
FIG. 1 is a schematic diagram illustrating a first mode provided in the disclosure.

The first mode: as illustrated in FIG. 1, a network device allocates a transmission resource to a terminal device, and the terminal device performs data transmission on an SL according to the resource allocated by the network device. The network device can allocate a resource for single transmission to the terminal device and can also allocate a resource for semi-static transmission to the terminal device. The first mode is also called mode 3 in long term evolution (LTE)-V2X.

Figure 2:
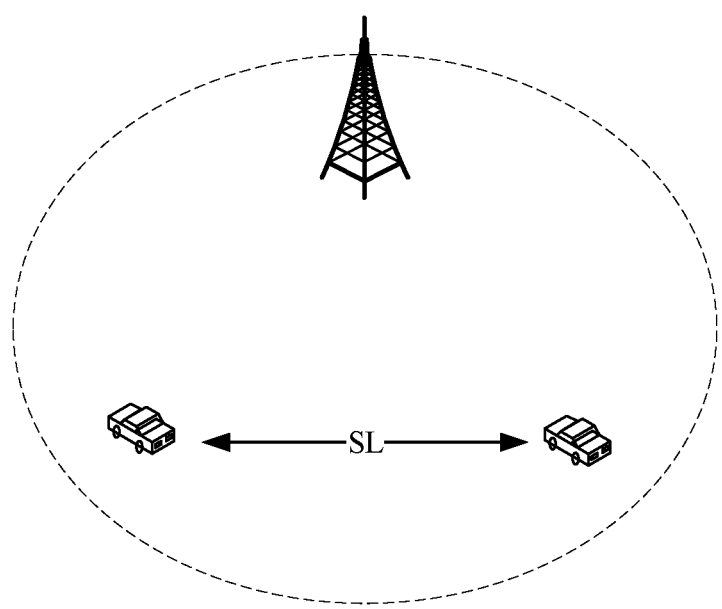
FIG. 2 is a schematic diagram illustrating a second mode provided in the disclosure.

The second mode: as illustrated in FIG. 2, a terminal device selects a resource for data transmission from a resource pool. The second mode is also called mode 4 in LTE-V2X.

2. New Radio (NR)-V2X

In NR-V2X, autonomous driving may be supported, and thus a higher request for data interaction between vehicles is required, such as higher throughput, lower latency, higher reliability, a larger coverage range, a more flexible resource allocation, or the like.

Figure 3:
FIG. 3 is a schematic diagram illustrating unicast transmission provided in implementations of the disclosure.
Figure 4:
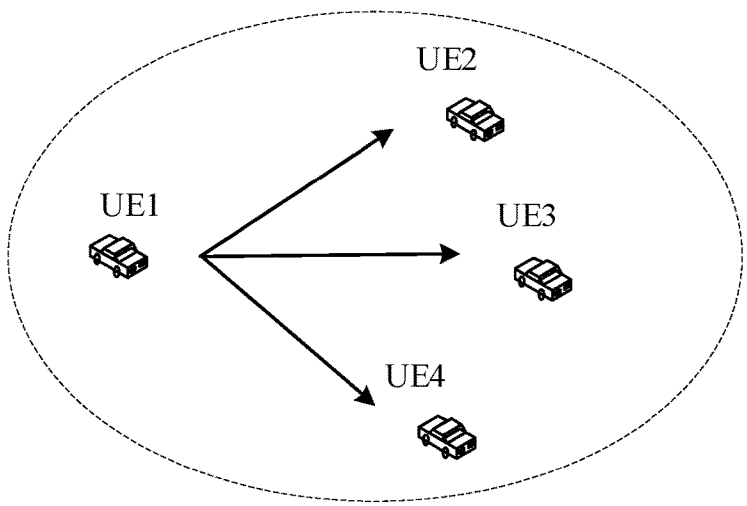
FIG. 4 is a schematic diagram illustrating multicast transmission provided in implementations of the disclosure.
Figure 5:
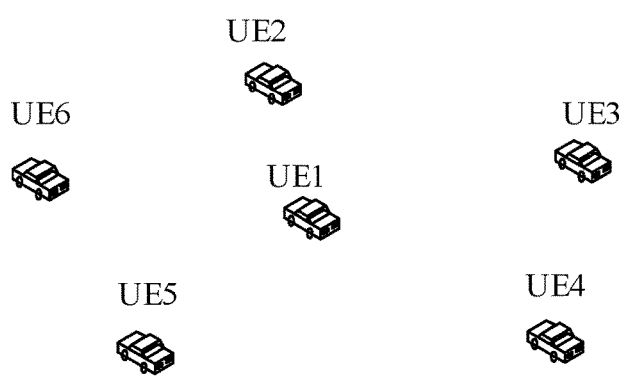
FIG. 5 is a schematic diagram illustrating broadcast transmission provided in implementations of the disclosure.

In NR-V2X, a unicast transmission mode and a multicast transmission mode are introduced. For unicast transmission, there is only one receiving terminal device. As illustrated in FIG. 3, unicast transmission is performed between user equipment (UE) 1 and UE2. For multicast transmission, all terminal devices in a communication group or all terminal devices within a certain transmission distance each are a receiving terminal device. As illustrated in FIG. 4, UE1, UE2, UE3, and UE4 constitute a communication group, where UE1 transmits data, and other UEs in the group each are a receiving terminal device. For broadcast transmission, any one terminal device around a transmitting terminal device is a receiving terminal device. As illustrated in FIG. 5, UE1 is a transmitting terminal device, and other UEs, i.e., UE2 to UE6, around UE1 each are a receiving terminal device.

3. SL Feedback

In NR-V2X, for improving reliability, an SL feedback channel is introduced. For example, for unicast transmission, a transmitting terminal device transmits to a receiving terminal device SL data, where the SL data includes data on a physical sidelink control channel (PSCCH) and data on a physical sidelink shared channel (PSSCH). The receiving terminal device transmits SL feedback information to the transmitting terminal device, and the transmitting terminal device determines whether to perform retransmission according to the feedback information of the receiving terminal device. The SL feedback information is also called hybrid automatic repeat request (HARQ) feedback information. The SL feedback information is carried in an SL feedback channel such as a physical sidelink feedback channel (PSFCH).

The transmitting terminal device can dynamically activate or deactivate SL feedback through sidelink control information (SCI). If SL feedback is activated, the receiving terminal device receives the SL data transmitted by the transmitting terminal device, and feeds back acknowledgement (ACK) or negative acknowledgement (NACK) to the transmitting terminal device according to a detection result, and the transmitting terminal device determines to transmit retransmission data or new data according to the feedback information of the receiving terminal device. If SL feedback is deactivated, the receiving terminal device does not need to transmit feedback information, and the transmitting terminal device usually transmits data through blind retransmission. For example, the transmitting terminal device repeatedly transmits each SL data K times instead of determining whether to transmit retransmission data according to the SL feedback information. If an SL transmission resource is scheduled by a network device, i.e., in the above first mode, the transmitting terminal device needs to report the SL feedback information to the network device, and the network device determines whether to allocate a retransmission resource to the terminal device according to the ACK or NACK reported by the terminal device.

4. Definition of a Resource on a Transmission Channel

In the disclosure, a PSSCH resource is called an SL transmission resource. A PSFCH resource is called an SL feedback resource. A physical uplink control channel (PUCCH) or a physical uplink shared channel (PUSCH) is used to transmit SL feedback information that is transmitted to the receiving terminal device by the transmitting terminal device, and a PUCCH or PUSCH resource is called an uplink (UL) transmission resource.

Figure 6:
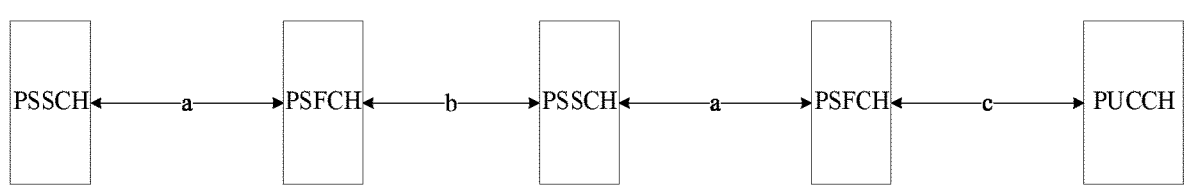
FIG. 6 is a diagram illustrating a sequence between transmission channels provided in implementations of the disclosure.

FIG. 6 is a diagram illustrating a sequence between transmission channels provided in implementations of the disclosure. As illustrated in FIG. 6, a network device allocates two PSSCH resources and a PUCCH resource at once through downlink control information (DCI). Supposing that a time when a receiving terminal device processes a PSSCH and prepares transmission of SL feedback information through a PSFCH is a, a time interval between a start position of a first symbol for the PSFCH corresponding to the PSSCH and an end position of a last time-domain symbol occupied by the PSSCH cannot be less than a, i.e., the time interval is required to be greater than or equal to a. Alternatively, the start position of the first symbol for the PSFCH corresponding to the PSSCH cannot be before a position that is a time interval a plus the end position of the last time-domain symbol occupied by the PSSCH. A transmitting terminal device receives the PSFCH. If NACK is carried in the PSFCH, the transmitting terminal device needs to prepare retransmission of a PSSCH, and a time interval between a time for retransmission of the PSSCH and a time for receiving and processing the PSFCH cannot be less than b, where b includes at least a time when the transmitting terminal device detects the PSFCH, a time when the transmitting terminal device prepares retransmission of the PSSCH, and a transceiving conversion time. For example, as illustrated in FIG. 6, a time interval between an end position of a last time-domain symbol occupied by the PSFCH and a start position of a first symbol for a next PSSCH is required to be greater than or equal to b. Alternatively, the start position of the first symbol for the next PSSCH for retransmission cannot be before a position that the time interval b plus the end position of the last time-domain symbol for the PSFCH corresponding to the previous PSSCH. FIG. 6 illustrates a case that the time interval between the end position of the last time-domain symbol occupied by the PSFCH and the start position of the first symbol for the next PSSCH is equal to b. A time interval between the time when the transmitting terminal device receives a PSFCH and the time when the transmitting terminal device prepares to report the SL feedback information to a network through a PUCCH (or a PUSCH) is c. That is, an interval between an end position of a last time-domain symbol occupied by the PSFCH and a start position of a first symbol for the PUCCH cannot be less than c. Alternatively, the start position of the first symbol for the PUCCH cannot be before a position that the time interval c plus the end position of the last time-domain symbol occupied by the last PSFCH corresponding to the PSSCH allocated by the network. FIG. 6 illustrates a case that the time interval between the end position of the last time-domain symbol occupied by the PSFCH and the start position of the first symbol for the PUCCH is equal to c. Therefore, in the second mode, i.e., in a case that the terminal device autonomously selects a resource, if SL feedback is activated and the terminal device selects a transmission resource, a minimum time interval Z between two adjacent PSSCHs is required to satisfy Z=a+b. For example, as illustrated in FIG. 6, a time interval between two adjacent PSSCHs is a+b.

If SL feedback is deactivated, i.e., the receiving terminal device does not need to perform SL feedback, the transmitting terminal device can adopt blind retransmission, in this case, two adjacent PSSCH transmission resources may be in adjacent slots.

In the second mode, the terminal device can autonomously select a resource. However, as mentioned above, in the first mode, the network device is not sure whether the transmitting terminal device has activated or deactivated SL feedback, and thus when the network device allocates a transmission resource to the transmitting terminal device, the network device does not consider whether SL feedback is activated. However, the transmitting terminal device and the receiving terminal device need to take processing time to detect received data or prepare data to-be-transmitted, which may result in that the network device unreasonably allocates transmission resources. For example, supposing that according to transmission resources configured by the network device, a time interval between adjacent PSSCH resources configured by the network device is less than a+b, data transmission cannot be performed, thereby reducing reliability of a communication system.

For solving the technical problem, in the disclosure, whether to activate SL feedback is determined according to a time interval between transmission resources allocated by the network device. Alternatively, the terminal device can perform SL transmission by using part of transmission resources allocated by the network device, and activate SL feedback. Alternatively, the terminal device can indicate whether to activate or deactivate SL feedback to the network device, such that the network device can allocate transmission resources. Alternatively, the network device indicates the terminal device to activate or deactivate SL feedback. In this case, the network device can know whether SL feedback is activated, and based on this, the network device can allocate transmission resources.

It can be understood that, the terminal device in implementations of the disclosure may also be called a UE, an access terminal, a subscriber unit, a subscriber station, a mobile station, a mobile platform, a remote station, a remote terminal, a mobile device, a user terminal, a wireless communication device, a terminal, a user agent or a user apparatus, etc. The terminal device may be a station (ST) in a wireless local area network (WLAN), a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, a terminal device in a next-generation communication system such as an NR network, a terminal device in a future evolved public land mobile network (PLMN), etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets for physical sign monitoring, smart jewelry, or the like.

The network device may be a device that is used to communicate with a mobile device. The network device may be an access point (AP) in the WLAN, a base transceiver station (BTS) in a global system of mobile communication (GSM) or code division multiple access (CDMA) system, a NodeB (NB) in a wideband code division multiple access (WCDMA) system, or an evolved NodeB (eNB or eNodeB) in an LTE system. Alternatively, the network device may also be a relay station, an AP, an in-vehicle device, a wearable device, a generation NodeB (gNB) or a network device in the NR network, or a network device in the future evolved PLMN.

It can be understood that, implementations of the disclosure are suitable for not only a communication architecture such as D2D, V2V, or V2X, but also other D2D communication architectures, which is not limited herein. Implementations of the disclosure are applicable to an unlicensed spectrum, where the unlicensed spectrum can also be called an unlicensed spectrum.

It can be understood that, the "indication" referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term "correspondence" may represent a direct correspondence or indirect correspondence between the two, may also represent an association relation between the two, or may further represent a relation of indicating and being indicated, a relation of configuring and being configured, or other relations.

The following will illustrate in details technical solutions in the disclosure.

It is to be noted that, a terminal device referred to in following implementations is a transmitting terminal device, which will not be repeated herein.

Implementation 1

Figure 7:
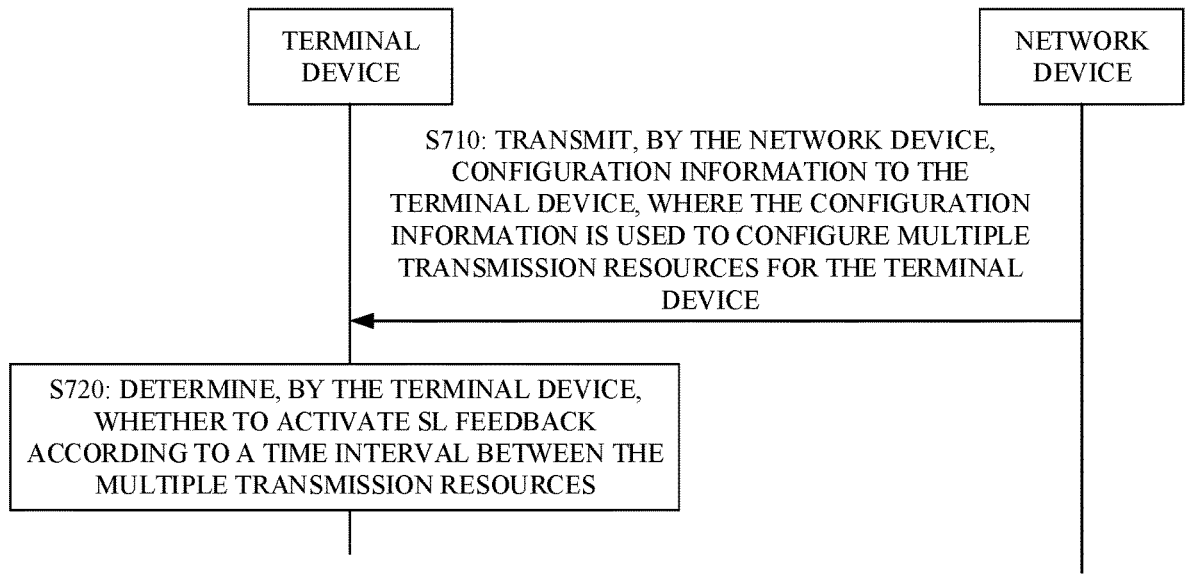
FIG. 7 is an interaction flow chart illustrating a method for wireless communication provided in implementations of the disclosure.

FIG. 7 is an interaction flow chart illustrating a method for wireless communication provided in implementations of the disclosure. As illustrated in FIG. 7, the method includes the following.

At S710, a network device transmits configuration information to a terminal device, where the configuration information is used to configure multiple transmission resources for the terminal device.

At S720, the terminal device determines whether to activate SL feedback according to a time interval between the multiple transmission resources.

Optionally, the configuration information is used to configure multiple SL transmission resources for the terminal device.

Optionally, the configuration information is used to configure multiple SL transmission resources and a UL transmission resource for the terminal device.

Optionally, the configuration information is used to configure an SL transmission resource and a UL transmission resource for the terminal device.

For the above configuration information with different functions, the operations at S720 include different optional manners as follows, which are not limited herein.

Optional manner 1: the configuration information is used to configure multiple SL transmission resources for the terminal device. If a time interval between at least one set of two adjacent SL transmission resources in the multiple SL transmission resources is less than a first threshold, the terminal device deactivates SL feedback.

Optional manner 2: the configuration information is used to configure multiple SL transmission resources for the terminal device. If at least one set of two adjacent SL transmission resources in the multiple SL transmission resources satisfies a first condition, the terminal device deactivates SL feedback. For any one set of two adjacent SL transmission resources in the at least one set of two adjacent SL transmission resources, two adjacent SL transmission resources satisfy the first condition as follows. A start position of a second SL transmission resource in the two adjacent SL transmission resources is before a position that is a second threshold plus an end position of an SL feedback resource corresponding to a first SL transmission resource in the two adjacent SL transmission resources. It can be understood that, in the two adjacent SL transmission resources, the first SL transmission resource is early in a time domain, and the second SL transmission resource is late in the time domain.

Optional manner 3: the configuration information is used to configure multiple SL transmission resources and a UL transmission resource for the terminal device. If a time interval between at least one set of two adjacent SL transmission resources in the multiple SL transmission resources is less than a first threshold, and/or, a time interval between a last SL feedback resource corresponding to the multiple SL transmission resources and the UL transmission resource is less than a third threshold, the terminal device deactivates SL feedback.

Optional manner 4: the configuration information is used to configure multiple SL transmission resources and a UL transmission resource for the terminal device. If at least one set of two adjacent SL transmission resources in the multiple SL transmission resources satisfies the above first condition, and/or, a time interval between a last SL feedback resource corresponding to the multiple SL transmission resources and the UL transmission resource is less than a third threshold, the terminal device deactivates SL feedback.

Optional manner 5: the configuration information is used to configure an SL transmission resource and a UL transmission resource for the terminal device, where the SL transmission resource is used for PSSCH transmission. If a time interval between an SL feedback resource corresponding to the SL transmission resource and the UL transmission resource is less than a third threshold, the terminal device deactivates SL feedback, where the SL feedback resource is used for PSFCH transmission.

Optionally, the first threshold is determined according to a first time interval and a second time interval. The first time interval is determined according to a time interval between a first SL transmission resource in the two adjacent SL transmission resources and an SL feedback resource corresponding to the first SL transmission resource, e.g., the first time interval may be the parameter a in the solution corresponding to FIG. 6. The first time interval is determined according to a period parameter of an SL feedback resource configured by a network. The second time interval is determined according to at least one of: a time when the terminal device processes a PSFCH, a time when the terminal device prepares PSSCH retransmission, or a transceiving conversion time, e.g., the second time interval may be the parameter b in the solution corresponding to FIG. 6.

Optionally, the first threshold is a sum of the first time interval and the second time interval. For example, the first threshold may be a+b in the solution corresponding to FIG. 6.

Optionally, the first threshold is a sum of the first time interval, the second time interval, and a time length that is occupied by a PSFCH. For example, the first threshold may be a+b+a time length that is occupied by a PSFCH in the solution corresponding to FIG. 6. Optionally, a time length that is occupied by a PSFCH is a time length for a time-domain symbol or two time-domain symbols.

Optionally, the first threshold is preconfigured, configured by a network, or predefined by an agreement, which is not limited herein.

Optionally, the first threshold is determined by the terminal device. For example, according to time-domain locations of SL transmission resources allocated by the network device, the terminal device determines locations of PSFCHs corresponding to the SL transmission resources, and determines the first time interval. Furthermore, the terminal device can determine the first threshold according to the second time interval predefined by an agreement, e.g., the first threshold is a sum of the first time interval and the second time interval.

Optionally, a time interval between two transmission resources illustrated in the disclosure may be a time interval between an end position of a first transmission resource in the two transmission resources and a start position of a second transmission resource in the two transmission resources. For example, the first time interval is a time interval between an end position of the first SL transmission resource and a start position of an SL feedback resource corresponding to the first SL transmission resource. Alternatively, the time interval between the two transmission resources may be a time interval between the end position of the first transmission resource in the two transmission resources and an end position of the second transmission resource in the two transmission resources. Alternatively, the time interval between the two transmission resources may be a time interval between a start position of the first transmission resource in the two transmission resources and the start position of the second transmission resource in the two transmission resources, which is not limited in the disclosure.

It can be understood that, an end position in the disclosure can be illustrated as an end position of a time-domain symbol, and a start position can be illustrated as a start position of a time-domain symbol. For example, the end position of the first SL transmission resource is an end position of a last time-domain symbol of the first SL transmission resource. The start position of the SL feedback resource corresponding to the first SL transmission resource is a start position of a first time-domain symbol of the SL feedback resource corresponding to the first SL transmission resource.

Optionally, the second threshold is preconfigured, configured by a network, or predefined by an agreement, which is not limited herein. Taking the solution illustrated in FIG. 6 as an example, the second threshold may be the parameter b.

Optionally, the second threshold is determined according to at least one of: a time when the terminal device processes a PSFCH, a time when the terminal device prepares PSSCH retransmission, or a transceiving conversion time. That is, the second threshold is related with a capability of the terminal device.

Optionally, the third threshold is preconfigured, configured by a network, or protocol predefined by an agreement, which is not limited herein. Taking the solution illustrated in FIG. 6 as an example, the third threshold may be the parameter c.

Optionally, the third threshold is determined according to at least one of: a time when the terminal device processes a PSFCH or a time when the terminal device prepares to report SL feedback information to the network through a PUCCH (or a PUSCH). That is, the third threshold is related with a capability of the terminal device.

The following will illustrate solutions through implementations.

Figure 8:
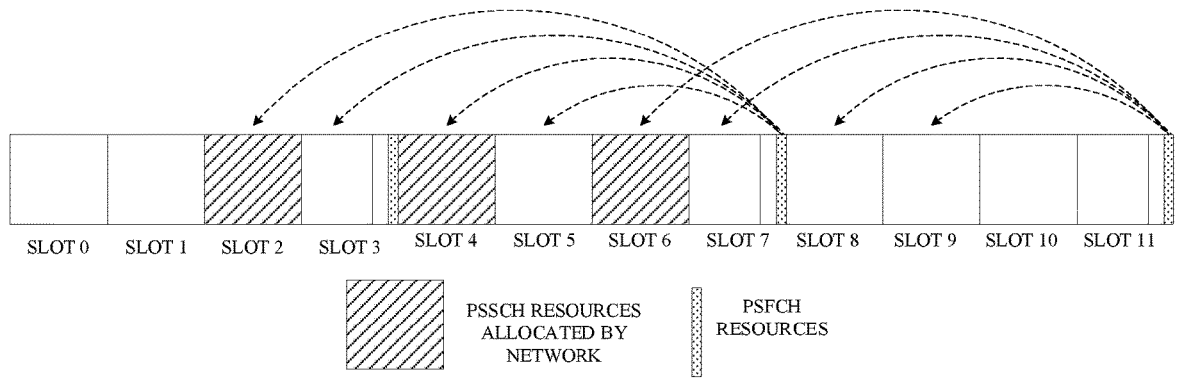
FIG. 8 is a schematic diagram illustrating resource distribution provided in implementations of the disclosure.

FIG. 8 is a schematic diagram illustrating resource distribution provided in implementations of the disclosure. As illustrated in FIG. 8, for example, according to a configuration by the network device, it is determined that PSFCHs corresponding to PSSCHs transmitted in slots 2/3/4/5 are all transmitted in slot 7, and PSFCHs corresponding to PSSCHs transmitted in slots 6/7/8/9 are all transmitted in slot 11. A slot is assumed to include 14 time-domain symbols, i.e., symbol 0 to symbol 13. If a slot does not include a PSFCH transmission resource, time-domain symbols occupied by a PSSCH are symbol 0 to symbol 12, and a last time-domain symbol (i.e., symbol 13) in the slot is a guard period (GP) symbol, where the GP symbol is not used to map PSSCH data. If a slot includes a PSFCH transmission resource, time-domain symbols occupied by a PSSCH are symbol 0 to symbol 9, time-domain symbols occupied by the PSFCH are symbol 11 and symbol 12, and symbol 10 and symbol 13 in the slot are GP symbols. Supposing that the network device allocates to the terminal device three PSSCH resources, the three PSSCH resources are respectively in slots 2, 4, and 6. Supposing that the above second time interval, i.e., b, is one slot, b=14 time-domain symbols. As illustrated in FIG. 8, a PSFCH corresponding to a PSSCH in slot 2 is in slot 7, a first time-domain symbol for the PSSCH in slot 2 is symbol 0, a last time-domain symbol for the PSSCH in slot 2 is symbol 12, a first time-domain symbol for the PSFCH in slot 7 is time-domain symbol 11, and thus the first time interval a=1+4*14+12=69 time-domain symbols. However, b=14 time-domain symbols. A time interval between slot 2 and slot 4 is two slots, i.e., 28 time-domain symbols, and 28<69+14, in this case, the terminal device is required to activate SL feedback. If the terminal device is required to activate SL feedback, for a PSSCH transmitted in slot 2, corresponding SL feedback can be received in slot 7, in this case, PSSCHs in slot 4 and slot 6 cannot be used. Alternatively, from another point of view, as illustrated in FIG. 8, if the terminal device transmits SL data in slot 2 and activates SL feedback, a corresponding PSFCH is in slot 7, while resources for retransmission allocated by the network device are in slot 4 and slot 6, where slot 4 and slot 6 are before a time slot in which the PSFCH is located. Therefore, the resources in slot 4 and slot 6 allocated by the network device cannot be used.

It can be understood that, in the above implementations, the terminal device determining whether to activate SL feedback according to a time interval between multiple transmission resources can be that the terminal device determines a time interval between multiple transmission resources according to the multiple transmission resources allocated by a network or can also be that the terminal device determines a time interval according to one or more transmission resources in the multiple transmission resources allocated by the network. For example, if the network device allocates two SL transmission resources and a UL transmission resource, the terminal device can determine a time interval according to the two SL transmission resources, according to an SL feedback resource corresponding to a first SL transmission resource and a second SL transmission resource, according to the second SL transmission resource and the UL transmission resource, or according to an SL feedback resource corresponding to the second SL transmission resource and the UL transmission resource.

In sum up, in the disclosure, in the first mode, the terminal device determines whether to activate SL feedback according to a time interval between multiple transmission resources. That is, only if the time interval between the multiple transmission resources is satisfied with a time condition of that the terminal device performs reception or processing, prepares for transmission, etc., SL feedback can be activated, otherwise, SL feedback is deactivated, thereby ensuring normal data transmission, and thus improving reliability of a communication system.

Implementation 2

Figure 9:
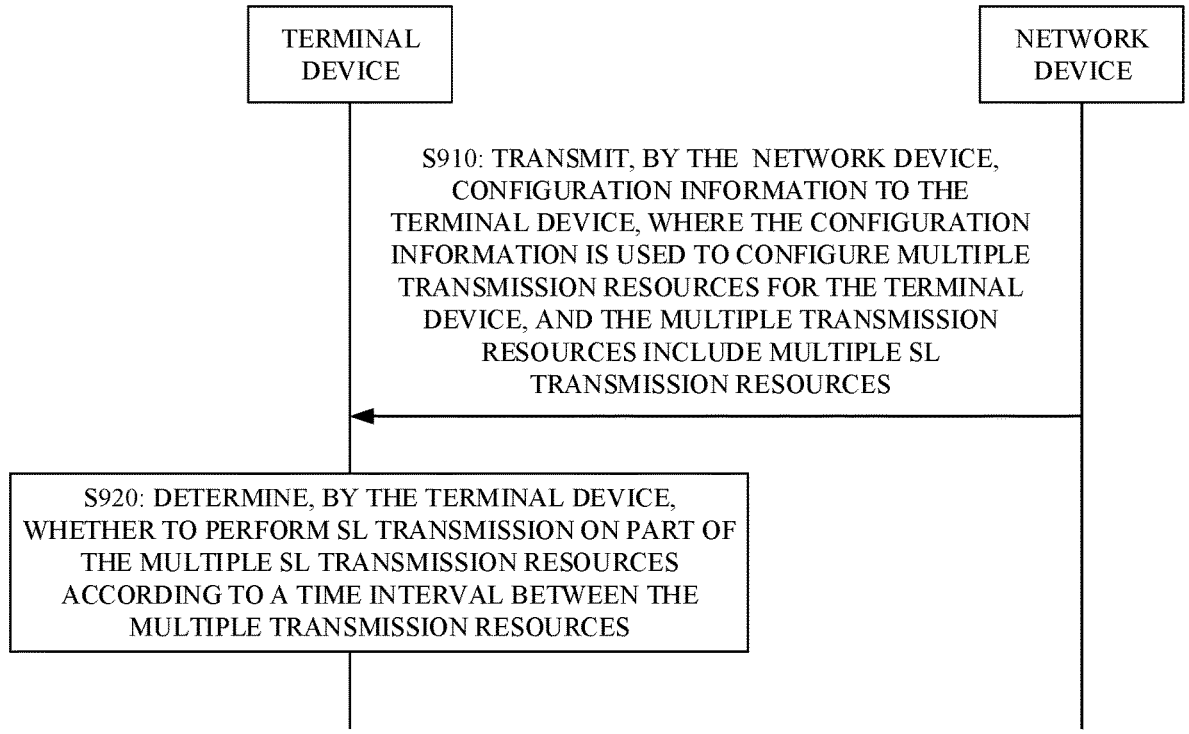
FIG. 9 is another interaction flow chart illustrating a method for wireless communication provided in implementations of the disclosure.

FIG. 9 is another interaction flow chart illustrating a method for wireless communication provided in implementations of the disclosure. As illustrated in FIG. 9, the method includes the following.

At S910, a network device transmits configuration information to a terminal device, where the configuration information is used to configure multiple transmission resources for the terminal device, and the multiple transmission resources include multiple SL transmission resources.

At S920, the terminal device determines whether to perform SL transmission on part of the multiple SL transmission resources according to a time interval between the multiple transmission resources.

Optionally, the operations at S920 include the following several optional manners, which are not limited herein.

Optional manner 1: if a time interval between at least one set of two adjacent SL transmission resources in the multiple SL transmission resources is less than a first threshold, the terminal device determines to perform SL transmission on the part of the multiple SL transmission resources.

Optional manner 2: if at least one set of two adjacent SL transmission resources in the multiple SL transmission resources satisfies a first condition, the terminal device determines to perform SL transmission on the part of the multiple SL transmission resources. For any one set of two adjacent SL transmission resources in the at least one set of two adjacent SL transmission resources, two adjacent SL transmission resources satisfy the first condition as follows. A start position of a second SL transmission resource in the two adjacent SL transmission resources is before a position that is a second threshold plus an end position of an SL feedback resource corresponding to a first SL transmission resource in the two adjacent SL transmission resources. It can be understood that, in the two adjacent SL transmission resources, the first SL transmission resource is early in a time domain, and the second SL transmission resource is late in the time domain.

Optional manner 3: the multiple transmission resources further include a UL transmission resource. If a time interval between at least one set of two adjacent SL transmission resources in the multiple SL transmission resources is less than a first threshold, and/or, a time interval between a last SL feedback resource corresponding to the multiple SL transmission resources and the UL transmission resource is less than a third threshold, the terminal device determines to perform SL transmission on the part of the multiple SL transmission resources.

Optional manner 4: the multiple transmission resources further include a UL transmission resource. If at least one set of two adjacent SL transmission resources in the multiple SL transmission resources satisfies the above first condition, and/or, a time interval between a last SL feedback resource corresponding to the multiple SL transmission resources and the UL transmission resource is less than a third threshold, the terminal device determines to perform SL transmission on the part of the multiple SL transmission resources.

It can be understood that, for concepts involved in the above four optional manners, reference can be made to the explanation of these concepts in implementation 1, which will not be repeated herein.

Optionally, the part of the multiple SL transmission resources includes any one SL transmission resource in the multiple SL transmission resources. For example, as illustrated in FIG. 8, the part of the multiple SL transmission resources may be a PSSCH resource in slot 2, 4, or 6.

Optionally, the part of the multiple SL transmission resources includes at least two SL transmission resources in the multiple SL transmission resources. A time interval between any two adjacent SL transmission resources in the at least two SL transmission resources is greater than or equal to the first threshold, and/or, a time interval between a last SL feedback resource corresponding to the at least two SL transmission resources and the UL transmission resource is greater than or equal to the third threshold. For example, according to a configuration by the network device, it is determined that PSFCHs corresponding to PSSCHs transmitted in slots 2/3/4/5 are all transmitted in slot 7, PSFCHs corresponding to PSSCHs transmitted in slots 6/7/8/9 are all transmitted in slot 11, and PSFCHs corresponding to PSSCHs transmitted in slots 10/11/12/13 are all transmitted in slot 15. A slot is assumed to include 14 time-domain symbols, i.e., symbol 0 to symbol 13. If a slot does not include a PSFCH transmission resource, time-domain symbols occupied by a PSSCH are symbol 0 to symbol 12, and a last time-domain symbol (i.e., symbol 13) in the slot is a GP symbol, where the GP symbol is not used to map PSSCH data. If a slot includes a PSFCH transmission resource, time-domain symbols occupied by a PSSCH are symbol 0 to symbol 9, time-domain symbols occupied by the PSFCH are symbol 11 and symbol 12, and symbol 10 and symbol 13 in the slot are GP symbols. Supposing that the network device allocates to the terminal device three PSSCH resources, the three PSSCH resources are respectively in slots 2, 6, and 10. Supposing that the above second time interval, i.e., b, is one slot, b=14 time-domain symbols. A PSFCH corresponding to a PSSCH in slot 2 is in slot 7, a first time-domain symbol for the PSSCH in slot 2 is symbol 0, a last time-domain symbol for the PSSCH in slot 2 is symbol 12, a first time-domain symbol for the PSFCH in slot 7 is time-domain symbol 11, and thus the first time interval a=1+4*14+12=69 time-domain symbols. However, a time interval between an end position of the PSSCH in slot 2 and a start position of a PSSCH in slot 10 is 1+7*14=99 time-domain symbols, where 99>69+14, in this case, the PSSCH in slot 2 and the PSSCH in slot 10 can be used as the above part of the multiple SL transmission resources. Alternatively, from another point of view, if the terminal device transmits SL data in slot 2 and activates SL feedback, a corresponding PSFCH is in slot 7, while resources for retransmission allocated by the network device are in slot 10, where slot 10 is after a time slot in which the PSFCH is located. Therefore, the network device can perform data transmission on the resources in slot 2 and slot 10.

Optionally, if the terminal device determines to perform SL transmission on the part of the multiple SL transmission resources, the terminal device activates SL feedback.

In sum up, in the disclosure, in the first mode, the terminal device determines whether to perform SL transmission on the part of the multiple SL transmission resources according to the time interval between the multiple transmission resources. That is, if the time interval between the multiple transmission resources is not satisfied with a time condition of that the terminal device performs reception or processing, prepares for transmission, etc., the terminal device can perform SL transmission on the part of the multiple SL transmission resources, thereby ensuring normal data transmission, and thus improving reliability of a communication system.

Implementation 3

Figure 10:
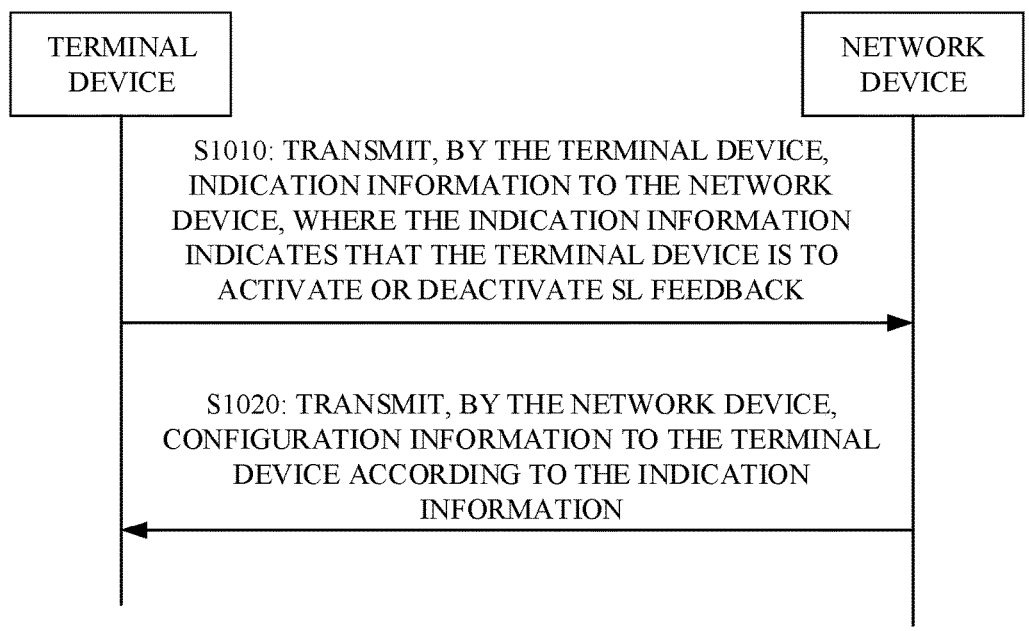
FIG. 10 is yet another interaction flow chart illustrating a method for wireless communication provided in implementations of the disclosure.

FIG. 10 is yet another interaction flow chart illustrating a method for wireless communication provided in implementations of the disclosure. As illustrated in FIG. 10, the method includes the following.

At S1010, a terminal device transmits indication information to a network device, where the indication information indicates that the terminal device is to activate or deactivate SL feedback.

Optionally, the terminal device transmits the indication information to the network device through radio resource control (RRC) signaling. For example, the terminal device transmits to the network device SidelinkUEInformation or UEAssistanceInformation, where the indication information is carried in the signaling.

At S1020, the network device transmits configuration information to the terminal device according to the indication information.

Optionally, the configuration information is used to configure multiple SL transmission resources for the terminal device.

Optionally, the configuration information is used to configure multiple SL transmission resources and a UL transmission resource for the terminal device.

Optionally, the configuration information is used to configure an SL transmission resource and a UL transmission resource for the terminal device.

For the above configuration information with different functions, the operations at S1020 include different optional manners as follows, which are not limited herein.

Optional manner 1: the configuration information is used to configure multiple SL transmission resources for the terminal device. If the indication information indicates that the terminal device is to activate SL feedback, a time interval between any one set of two adjacent SL transmission resources in the multiple SL transmission resources is greater than or equal to a first threshold.

Optional manner 2: the configuration information is used to configure multiple SL transmission resources for the terminal device. If the indication information indicates that the terminal device is to activate SL feedback, any one set of two adjacent SL transmission resources in the multiple SL transmission resources satisfies a second condition. The any one set of two adjacent SL transmission resources satisfies the second condition as follows. A start position of a second SL transmission resource in the any one set of two adjacent SL transmission resources is after a position that is a second threshold plus an end position of an SL feedback resource, where the SL feedback resource corresponds to a first SL transmission resource in the any one set of two adjacent SL transmission resources. It can be understood that, in the two adjacent SL transmission resources, the first SL transmission resource is early in a time domain, and the second SL transmission resource is late in the time domain.

Optional manner 3: the configuration information is used to configure multiple SL transmission resources and a UL transmission resource for the terminal device. If the indication information indicates that the terminal device is to activate SL feedback, a time interval between any one set of two adjacent SL transmission resources in the multiple SL transmission resources is greater than or equal to a first threshold, and/or, a time interval between a last SL feedback resource corresponding to the multiple SL transmission resources and the UL transmission resource is greater than or equal to a third threshold.

Optional manner 4: the configuration information is used to configure multiple SL transmission resources and a UL transmission resource for the terminal device. If the indication information indicates that the terminal device is to activate SL feedback, any one set of two adjacent SL transmission resources in the multiple SL transmission resources satisfies a second condition, and/or, a time interval between a last SL feedback resource corresponding to the multiple SL transmission resources and the UL transmission resource is greater than or equal to a third threshold.

Optional manner 5: the configuration information is used to configure an SL transmission resources and a UL transmission resource for the terminal device. If the indication information indicates that the terminal device is to activate SL feedback, a time interval between an SL feedback resource corresponding to the SL transmission resource and the UL transmission resource is greater than or equal to a third threshold, where the SL feedback resource is used for PSFCH transmission.

It can be understood that, for concepts involved in the above five optional manners, reference can be made to the explanation of these concepts in implementation 1, which will not be repeated herein.

In sum up, in the disclosure, the terminal device can transmit to the network device an indication indicative of that the terminal device is to activate or deactivate SL feedback, and the network device can transmit the configuration information to the terminal device according to the indication, thereby ensuring normal data transmission, and thus improving reliability of a communication system.

Implementation 4

Figure 11:
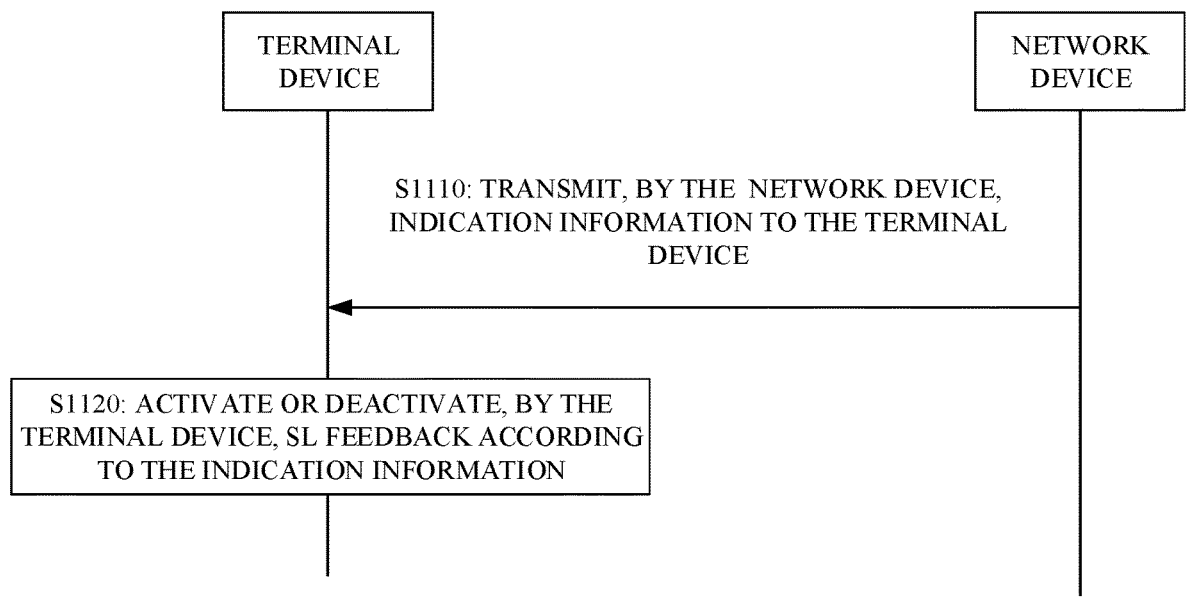
FIG. 11 is an interaction flow chart illustrating a method for wireless communication provided in implementations of the disclosure.

FIG. 11 is an interaction flow chart illustrating a method for wireless communication provided in implementations of the disclosure. As illustrated in FIG. 11, the method includes the following.

At S1110, a network device transmits indication information to a terminal device.

Optionally, the network device transmits the indication information to the terminal device through DCI, RRC signaling, a system information block (SIB), etc.

At S1120, the terminal device activates or deactivates SL feedback according to the indication information.

Optionally, the network device transmits configuration information to the terminal device according to the indication information.

Optionally, the configuration information is used to configure multiple SL transmission resources for the terminal device.

Optionally, the configuration information is used to configure multiple SL transmission resources and a UL transmission resource for the terminal device.

Optionally, the configuration information is used to configure an SL transmission resource and a UL transmission resource for the terminal device.

For the above configuration information with different functions, the operations at S1120 include different optional manners as follows, which are not limited herein.

Optional manner 1: the configuration information is used to configure multiple SL transmission resources for the terminal device. If the indication information indicates that the terminal device is to activate SL feedback, a time interval between any one set of two adjacent SL transmission resources in the multiple SL transmission resources is greater than or equal to a first threshold.

Optional manner 2: the configuration information is used to configure multiple SL transmission resources for the terminal device. If the indication information indicates that the terminal device is to activate SL feedback, any one set of two adjacent SL transmission resources in the multiple SL transmission resources satisfies a second condition. The any one set of two adjacent SL transmission resources satisfies the second condition as follows. A start position of a second SL transmission resource in the any one set of two adjacent SL transmission resources is after a position that is a second threshold plus an end position of an SL feedback resource, where the SL feedback resource corresponds to a first SL transmission resource in the any one set of two adjacent SL transmission resources. It can be understood that, in the two adjacent SL transmission resources, the first SL transmission resource is early in a time domain, and the second SL transmission resource is late in the time domain.

Optional manner 3: the configuration information is used to configure multiple SL transmission resources and a UL transmission resource for the terminal device. If the indication information indicates that the terminal device is to activate SL feedback, a time interval between any one set of two adjacent SL transmission resources in the multiple SL transmission resources is greater than or equal to a first threshold, and/or, a time interval between a last SL feedback resource corresponding to the multiple SL transmission resources and the UL transmission resource is greater than or equal to a third threshold.

Optional manner 4: the configuration information is used to configure multiple SL transmission resources and a UL transmission resource for the terminal device. If the indication information indicates that the terminal device is to activate SL feedback, any one set of two adjacent SL transmission resources in the multiple SL transmission resources satisfies a second condition, and/or, a time interval between a last SL feedback resource corresponding to the multiple SL transmission resources and the UL transmission resource is greater than or equal to a third threshold.

Optional manner 5: the configuration information is used to configure an SL transmission resources and a UL transmission resource for the terminal device. If the indication information indicates that the terminal device is to activate SL feedback, a time interval between an SL feedback resource corresponding to the SL transmission resource and the UL transmission resource is greater than or equal to a third threshold, where the SL feedback resource is used for PSFCH transmission.

It can be understood that, for concepts involved in the above five optional manners, reference can be made to the explanation of these concepts in implementation 1, which will not be repeated herein.

In sum up, in the disclosure, the network device transmits the indication information to the terminal device, and the terminal device activates or deactivates SL feedback according to the indication information. The network device can transmit the configuration information to the terminal device according to the indication, thereby ensuring normal data transmission, and thus improving reliability of a communication system.

The above illustrates in details the method implementations of the disclosure in conjunction with FIG. 7 to FIG. 11, and the following will illustrate in details apparatus implementations of the disclosure in conjunction with FIG. 12 to FIG. 20. It can be understood that, the apparatus implementations are in one-to-one correspondence with the method implementations, where for similar illustrations, reference can be made to the method implementations.

Figure 12:
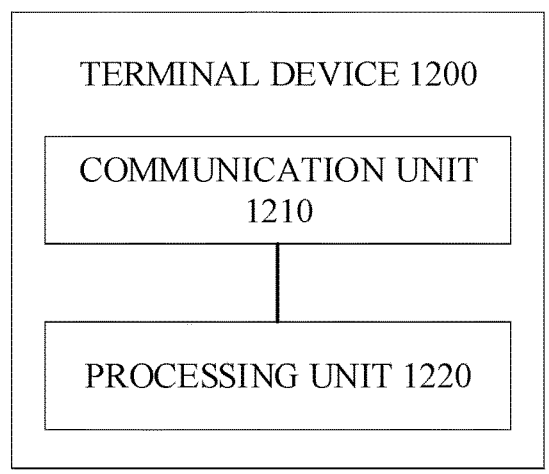
FIG. 12 illustrates a schematic block diagram of a terminal device 1200 according to implementations of the disclosure.

FIG. 12 illustrates a schematic block diagram of a terminal device 1200 according to implementations of the disclosure. As illustrated in FIG. 12, the terminal device 1200 includes a communication unit 1210 and a processing unit 1220.

The communication unit 1210 is configured to obtain configuration information transmitted by a network device, where the configuration information is used to configure multiple transmission resources for the terminal device The processing unit 1220 is configured to determine whether to activate SL feedback according to a time interval between the multiple transmission resources.

Optionally, the configuration information is used to configure multiple SL transmission resources for the terminal device, where the SL transmission resources are used for PSSCH transmission. The processing unit 1220 is specifically configured to deactivate SL feedback, if a time interval between at least one set of two adjacent SL transmission resources in the multiple SL transmission resources is less than a first threshold.

Optionally, the configuration information is used to configure multiple SL transmission resources for the terminal device, where the SL transmission resources are used for PSSCH transmission. The processing unit 1220 is specifically configured to deactivate SL feedback, if at least one set of two adjacent SL transmission resources in the multiple SL transmission resources satisfies a first condition. For any one set of two adjacent SL transmission resources in the at least one set of two adjacent SL transmission resources, two adjacent SL transmission resources satisfy the first condition as follows. A start position of a second SL transmission resource in the two adjacent SL transmission resources is before a position that is a second threshold plus an end position of an SL feedback resource, where the SL feedback resource corresponds to a first SL transmission resource in the two adjacent SL transmission resources and is used for PSFCH transmission.

Optionally, the configuration information is used to configure multiple SL transmission resources and a UL transmission resource for the terminal device, where the SL transmission resources are used for PSSCH transmission, and the UL transmission resource is used for PUCCH transmission or PUSCH transmission. The processing unit 1220 is specifically configured to deactivate SL feedback, if a time interval between at least one set of two adjacent SL transmission resources in the multiple SL transmission resources is less than a first threshold, and/or, a time interval between a last SL feedback resource corresponding to the multiple SL transmission resources and the UL transmission resource is less than a third threshold, where the last SL feedback resource is used for PSFCH transmission.

Optionally, the configuration information is used to configure an SL transmission resource and a UL transmission resource for the terminal device, where the SL transmission resource is used for PSSCH transmission, and the UL transmission resource is used for PUCCH transmission or PUSCH transmission. The processing unit 1220 is specifically configured to deactivate SL feedback, if a time interval between an SL feedback resource corresponding to the SL transmission resource and the UL transmission resource is less than a third threshold, where the SL feedback resource is used for PSFCH transmission.

Optionally, the first threshold is determined according to a first time interval and a second time interval. The first time interval is determined according to a time interval between a first SL transmission resource in the two adjacent SL transmission resources and an SL feedback resource corresponding to the first SL transmission resource. The second time interval is determined according to at least one of: a time when the terminal device receives and processes a PSFCH, a time when the terminal device prepares PSSCH retransmission, or a transceiving conversion time.

Optionally, the first threshold is a sum of the first time interval and the second time interval.

Optionally, the first threshold is a sum of the first time interval, the second time interval, and a time length that is occupied by the PSFCH.

Optionally, the first time interval is a time interval between an end position of the first SL transmission resource and a start position of the SL feedback resource corresponding to the first SL transmission resource.

Optionally, the end position of the first SL transmission resource is an end position of a last time-domain symbol of the first SL transmission resource. The start position of the SL feedback resource corresponding to the first SL transmission resource is a start position of a first time-domain symbol of the SL feedback resource corresponding to the first SL transmission resource.

Optionally, the first threshold is preconfigured, configured by a network, or predefined by an agreement.

Optionally, the second threshold is preconfigured, configured by a network, or predefined by an agreement.

Optionally, the third threshold is preconfigured, configured by a network, or protocol predefined by an agreement.

Optionally, in some implementations, the above communication unit may be a communication interface or a transceiver, or an input/output interface on a communication chip or a system on a chip (SoC). The above processing unit may be one or more processors.

It can be understood that, according to implementations of the disclosure, the terminal device 1200 can correspond to the terminal device in implementation 1, and the above-mentioned and other operations and/or functions of each unit in the terminal device 1200 respectively implement a corresponding procedure in implementation 1, which will not be repeated herein for sake of simplicity.

Figure 13:
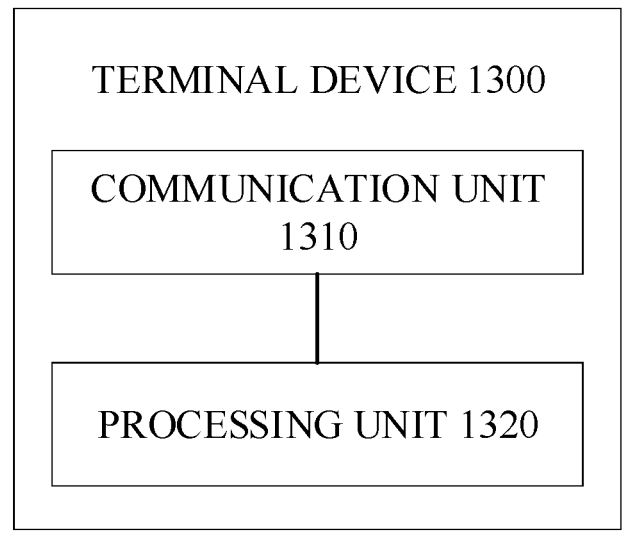
FIG. 13 illustrates a schematic block diagram of a terminal device 1300 according to implementations of the disclosure.

FIG. 13 illustrates a schematic block diagram of a terminal device 1300 according to implementations of the disclosure. As illustrated in FIG. 13, the terminal device 1300 includes a communication unit 1310 and a processing unit 1320.

The communication unit 1310 is configured to obtain configuration information transmitted by a network device. The configuration information is used to configure multiple transmission resources for the terminal device, the multiple transmission resources include multiple SL transmission resources, and the SL transmission resources are used for PSSCH transmission.

The processing unit 1320 is configured to determine whether to perform SL transmission on part of the multiple SL transmission resources according to a time interval between the multiple transmission resources.

Optionally, the processing unit 1320 is specifically configured to determine to perform SL transmission on the part of the multiple SL transmission resources, if a time interval between at least one set of two adjacent SL transmission resources in the multiple SL transmission resources is less than a first threshold.

Optionally, the processing unit 1320 is specifically configured to determine to perform SL transmission on the part of the multiple SL transmission resources, if at least one set of two adjacent SL transmission resources in the multiple SL transmission resources satisfies a first condition. For any one set of two adjacent SL transmission resources in the at least one set of two adjacent SL transmission resources, two adjacent SL transmission resources satisfy the first condition as follows. A start position of a second SL transmission resource in the two adjacent SL transmission resources is before a position that is a second threshold plus an end position of an SL feedback resource, where the SL feedback resource corresponds to a first SL transmission resource in the two adjacent SL transmission resources and is used for PSFCH transmission.

Optionally, the multiple transmission resources further include a UL transmission resource, where the UL transmission resource is used for PUCCH transmission or PUSCH transmission. The processing unit 1320 is specifically configured to determine to perform SL transmission on the part of the multiple SL transmission resources, if a time interval between at least one set of two adjacent SL transmission resources in the multiple SL transmission resources is less than a first threshold, and/or, a time interval between a last SL feedback resource corresponding to the multiple SL transmission resources and the UL transmission resource is less than a third threshold, where the last SL feedback resource is used for PSFCH transmission.

Optionally, the processing unit 1320 is further configured to activate SL feedback, if the terminal device determines to perform SL transmission on the part of the multiple SL transmission resources.

Optionally, the first threshold is determined according to a first time interval and a second time interval. The first time interval is determined according to a time interval between a first SL transmission resource in the two adjacent SL transmission resources and an SL feedback resource corresponding to the first SL transmission resource. The second time interval is determined according to at least one of: a time when the terminal device receives and processes a PSFCH, a time when the terminal device prepares PSSCH retransmission, or a transceiving conversion time.

Optionally, the first threshold is a sum of the first time interval and the second time interval.

Optionally, the first threshold is a sum of the first time interval, the second time interval, and a time length that is occupied by the PSFCH.

Optionally, the first time interval is a time interval between an end position of the first SL transmission resource and a start position of the SL feedback resource corresponding to the first SL transmission resource.

Optionally, the end position of the first SL transmission resource is an end position of a last time-domain symbol of the first SL transmission resource. The start position of the SL feedback resource corresponding to the first SL transmission resource is a start position of a time-domain symbol of the SL feedback resource corresponding to the first SL transmission resource.

Optionally, the first threshold is preconfigured, configured by a network, or predefined by an agreement.

Optionally, the second threshold is preconfigured, configured by a network, or predefined by an agreement.

Optionally, the third threshold is preconfigured, configured by a network, or predefined by an agreement.

Optionally, the part of the multiple SL transmission resources includes any one SL transmission resource in the multiple SL transmission resources.

Optionally, the part of the multiple SL transmission resources includes at least two SL transmission resources in the multiple SL transmission resources. A time interval between any two adjacent SL transmission resources in the at least two SL transmission resources is greater than or equal to the first threshold, and/or, a time interval between a last SL feedback resource corresponding to the at least two SL transmission resources and the UL transmission resource is greater than or equal to the third threshold.

Optionally, in some implementations, the above communication unit may be a communication interface or a transceiver, or an input/output interface on a communication chip or a SoC. The above processing unit may be one or more processors.

It can be understood that, according to implementations of the disclosure, the terminal device 1300 can correspond to the terminal device in implementation 2, and the above-mentioned and other operations and/or functions of each unit in the terminal device 1300 respectively implement a corresponding procedure in implementation 2, which will not be repeated herein for sake of simplicity.

Figure 14:
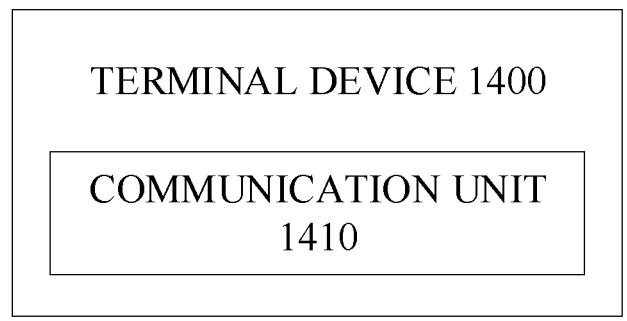
FIG. 14 illustrates a schematic block diagram of a terminal device 1400 according to implementations of the disclosure.

FIG. 14 illustrates a schematic block diagram of a terminal device 1400 according to implementations of the disclosure. As illustrated in FIG. 14, the terminal device 1400 includes a communication unit 1410. The communication unit 1410 is configured to transmit indication information to a network device, where the indication information indicates that the terminal device is to activate or deactivate SL feedback.

Optionally, in some implementations, the above communication unit may be a communication interface or a transceiver, or an input/output interface on a communication chip or a SoC.

It can be understood that, according to implementations of the disclosure, the terminal device 1400 can correspond to the terminal device in implementation 3, and the above-mentioned and other operations and/or functions of each unit in the terminal device 1400 respectively implement a corresponding procedure in implementation 3, which will not be repeated herein for sake of simplicity.

Figure 15:
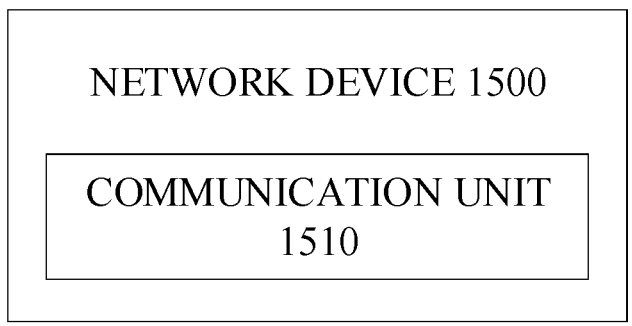
FIG. 15 illustrates a schematic block diagram of a network device 1500 according to implementations of the disclosure.

FIG. 15 illustrates a schematic block diagram of a network device 1500 according to implementations of the disclosure. As illustrated in FIG. 15, the network device 1500 includes a communication unit 1510. The communication unit 1510 is configured to receive indication information transmitted by a terminal device, where the indication information indicates that the terminal device is to activate or deactivate SL feedback. The communication unit 1510 is configured to transmit configuration information to the terminal device according to the indication information.

Optionally, the configuration information is used to configure multiple SL transmission resources for the terminal device, where the SL transmission resources are used for PSSCH transmission. If the indication information indicates that the terminal device is to activate SL feedback, a time interval between any one set of two adjacent SL transmission resources in the multiple SL transmission resources is greater than or equal to a first threshold.

Optionally, the configuration information is used to configure multiple SL transmission resources for the terminal device, where the SL transmission resources are used for PSSCH transmission. If the indication information indicates that the terminal device is to activate SL feedback, any one set of two adjacent SL transmission resources in the multiple SL transmission resources satisfies a second condition. The any one set of two adjacent SL transmission resources satisfies the second condition as follows. A start position of a second SL transmission resource in the any one set of two adjacent SL transmission resources is after a position that is a second threshold plus an end position of an SL feedback resource, where the SL feedback resource corresponds to a first SL transmission resource in the any one set of two adjacent SL transmission resources.

Optionally, the configuration information is used to configure multiple SL transmission resources and a UL transmission resource for the terminal device. If the indication information indicates that the terminal device is to activate SL feedback, a time interval between any one set of two adjacent SL transmission resources in the multiple SL transmission resources is greater than or equal to a first threshold, where the SL transmission resources are used for PSSCH transmission, and/or, a time interval between a last SL feedback resource corresponding to the multiple SL transmission resources and the UL transmission resource is greater than or equal to a third threshold, where the last SL feedback resource is used for PSFCH transmission.

Optionally, the configuration information is used to configure an SL transmission resources and a UL transmission resource for the terminal device. If the indication information indicates that the terminal device is to activate SL feedback, a time interval between an SL feedback resource corresponding to the SL transmission resource and the UL transmission resource is greater than or equal to a third threshold, where the SL feedback resource is used for PSFCH transmission.

Optionally, the first threshold is determined according to a first time interval and a second time interval. The first time interval is determined according to a time interval between a first SL transmission resource in the two adjacent SL transmission resources and an SL feedback resource corresponding to the first SL transmission resource. The second time interval is determined according to at least one of: a time when the terminal device receives and processes a PSFCH, a time when the terminal device prepares PSSCH retransmission, or a transceiving conversion time.

Optionally, the first threshold is a sum of the first time interval and the second time interval.

Optionally, the first threshold is a sum of the first time interval, the second time interval, and a time length that is occupied by the PSFCH.

Optionally, the first time interval is a time interval between an end position of the first SL transmission resource and a start position of the SL feedback resource corresponding to the first SL transmission resource.

Optionally, the end position of the first SL transmission resource is an end position of a last time-domain symbol of the first SL transmission resource. The start position of the SL feedback resource corresponding to the first SL transmission resource is a start position of a time-domain symbol of the SL feedback resource corresponding to the first SL transmission resource.

Optionally, the first threshold is preconfigured, configured by a network, or predefined by an agreement.

Optionally, the second threshold is preconfigured, configured by a network, or protocol predefined by an agreement.

Optionally, the third threshold is preconfigured, configured by a network, or protocol predefined by an agreement.

Optionally, in some implementations, the above communication unit may be a communication interface or a transceiver, or an input/output interface on a communication chip or a SoC.

It can be understood that, according to implementations of the disclosure, the network device 1500 can correspond to the network device in implementation 3, and the above-mentioned and other operations and/or functions of each unit in the network device 1500 respectively implement a method performed by the network device in implementation 3, which will not be repeated herein for sake of simplicity.

Figure 16:
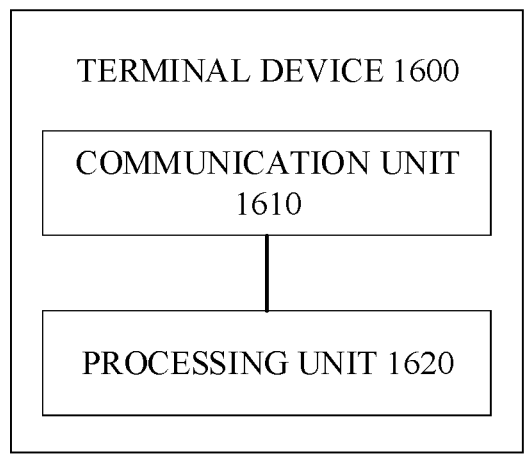
FIG. 16 illustrates a schematic block diagram of a terminal device 1600 according to implementations of the disclosure.

FIG. 16 illustrates a schematic block diagram of a terminal device 1600 according to implementations of the disclosure. As illustrated in FIG. 16, the terminal device 1600 includes a communication unit 1610 and a processing unit 1620.

The communication unit 1610 is configured to receive indication information transmitted by a network device.

The processing unit 1620 is configured to activate or deactivate SL feedback according to the indication information.

Optionally, in some implementations, the above communication unit may be a communication interface or a transceiver, or an input/output interface on a communication chip or a SoC.

It can be understood that, according to implementations of the disclosure, the terminal device 1600 can correspond to the terminal device in implementation 4, and the above-mentioned and other operations and/or functions of each unit in the terminal device 1600 respectively implement a corresponding process in implementation 4, which will not be repeated herein for sake of simplicity.

Figure 17:
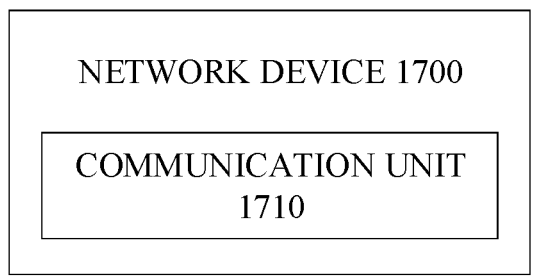
FIG. 17 illustrates a schematic block diagram of a network device 1700 according to implementations of the disclosure.

FIG. 17 illustrates a schematic block diagram of a network device 1700 according to implementations of the disclosure. As illustrated in FIG. 17, the network device 1700 includes a communication unit 1710. The communication unit 1710 is configured to transmit indication information to a terminal device, where the indication information indicates the terminal device to activate or deactivate SL feedback.

Optionally, the communication unit 1710 is further configured to transmit configuration information to the terminal device according to the indication information.

Optionally, the configuration information is used to configure multiple SL transmission resources for the terminal device. If the indication information indicates the terminal device to activate SL feedback, a time interval between any one set of two adjacent SL transmission resources in the multiple SL transmission resources is greater than or equal to a first threshold, where the SL transmission resources are used for PSSCH transmission.

Optionally, the configuration information is used to configure multiple SL transmission resources for the terminal device, where the SL transmission resources are used for PSSCH transmission. If the indication information indicates the terminal device to activate SL feedback, any one set of two adjacent SL transmission resources in the multiple SL transmission resources satisfies a second condition. The any one set of two adjacent SL transmission resources satisfies the second condition as follows. A start position of a second SL transmission resource in the any one set of two adjacent SL transmission resources is after a position that is a second threshold plus an end position of an SL feedback resource, where the SL feedback resource corresponds to a first SL transmission resource in the any one set of two adjacent SL transmission resources.

Optionally, the configuration information is used to configure multiple SL transmission resources and a UL transmission resource for the terminal device. If the indication information indicates the terminal device to activate SL feedback, a time interval between any one set of two adjacent SL transmission resources in the multiple SL transmission resources is greater than or equal to a first threshold, where the SL transmission resources are used for PSSCH transmission, and/or, a time interval between a last SL feedback resource corresponding to the multiple SL transmission resources and the UL transmission resource is greater than or equal to a third threshold, where the last SL feedback resource is used for PSFCH transmission.

Optionally, the configuration information is used to configure an SL transmission resources and a UL transmission resource for the terminal device. If the indication information indicates the terminal device to activate SL feedback, a time interval between an SL feedback resource corresponding to the SL transmission resource and the UL transmission resource is greater than or equal to a third threshold, where the SL feedback resource is used for PSFCH transmission.

Optionally, the first threshold is determined according to a first time interval and a second time interval. The first time interval is determined according to a time interval between a first SL transmission resource in the two adjacent SL transmission resources and an SL feedback resource corresponding to the first SL transmission resource. The second time interval is determined according to at least one of: a time when the terminal device receives and processes a PSFCH, a time when the terminal device prepares PSSCH retransmission, or a transceiving conversion time.

Optionally, the first threshold is a sum of the first time interval and the second time interval.

Optionally, the first threshold is a sum of the first time interval, the second time interval, and a time length that is occupied by the PSFCH.

Optionally, the first time interval is a time interval between an end position of the first SL transmission resource and a start position of the SL feedback resource corresponding to the first SL transmission resource.

Optionally, the end position of the first SL transmission resource is an end position of a last time-domain symbol of the first SL transmission resource. The start position of the SL feedback resource corresponding to the first SL transmission resource is a start position of a time-domain symbol of the SL feedback resource corresponding to the first SL transmission resource.

Optionally, the first threshold is preconfigured, configured by a network, or predefined by an agreement.

Optionally, the second threshold is preconfigured, configured by a network, or predefined by an agreement.

Optionally, the third threshold is preconfigured, configured by a network, or predefined by an agreement.

Optionally, in some implementations, the above communication unit may be a communication interface or a transceiver, or an input/output interface on a communication chip or a SoC.

It can be understood that, according to implementations of the disclosure, the network device 1700 can correspond to the terminal device in implementation 4, and the above-mentioned and other operations and/or functions of each unit in the network device 1700 respectively implement a method performed by the network device in implementation 4, which will not be repeated herein for sake of simplicity.

Figure 18:
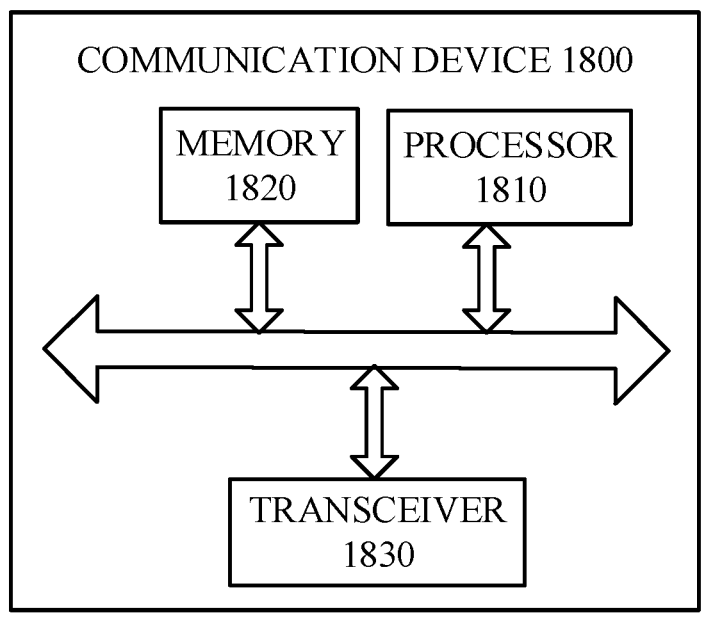
FIG. 18 is a schematic structural diagram illustrating a communication device 1800 provided in implementations of the disclosure.

FIG. 18 is a schematic structural diagram illustrating a communication device 1800 provided in implementations of the disclosure. As illustrated in FIG. 18, the communication device 1800 includes a processor 1810. The processor 1810 is configured to invoke and execute computer programs stored in a memory to implement the methods in implementations of the disclosure.

Optionally, as illustrated in FIG. 18, the communication device 1800 may further include a memory 1820. The processor 1810 can invoke and execute computer programs stored in the memory 1820 to implement the methods in implementations of the disclosure.

The memory 1820 may be a separate device from the processor 1810, or be integrated into the processor 1810.

Optionally, as illustrated in FIG. 18, the communication device 1800 may further include a transceiver 1830. The processor 1810 can control the transceiver 1830 to communicate with other devices. Specifically, the transceiver 1830 can transmit information or data to other devices, or receive information or data transmitted by other devices.

The transceiver 1830 may include a transmitter and a receiver, and further include one or more antennas.

Optionally, the communication device 1800 may be the network device in the implementations of the disclosure, and the communication device 1800 can implement a corresponding process implemented by the network device in each of the methods of the implementations of the disclosure, which will not be repeated herein for the sake of simplicity.

Optionally, the communication device 1800 may specifically be the terminal device in the implementations of the disclosure, and the communication device 1800 can implement a corresponding process implemented by the terminal device in each of the methods of the implementations of the disclosure, which will not be repeated herein for the sake of simplicity.

Figure 19:
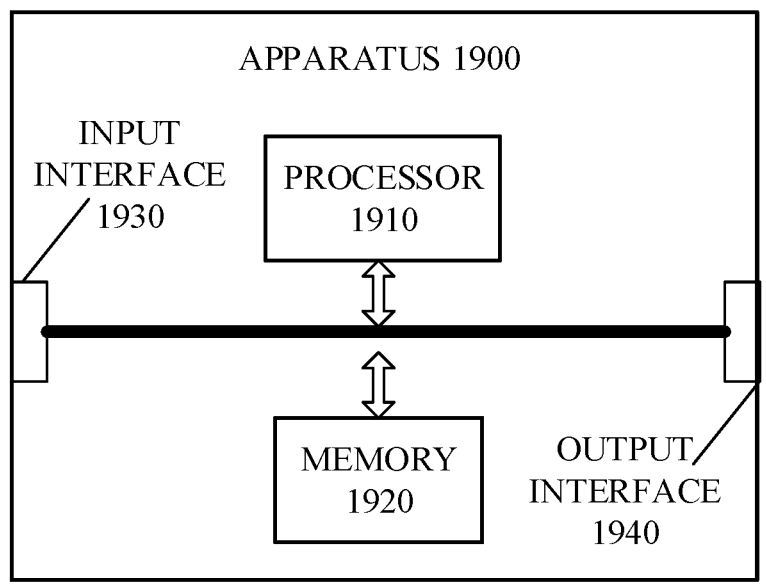
FIG. 19 is a schematic structural diagram illustrating an apparatus in implementations of the disclosure.

FIG. 19 is a schematic structural diagram illustrating an apparatus in implementations of the disclosure. As illustrated in FIG. 19, an apparatus 1900 includes a processor 1910. The processor 1910 is configured to invoke and execute computer programs stored in a memory to implement the methods in the implementations of the disclosure.

Optionally, as illustrated in FIG. 19, the apparatus 1900 may further include a memory 1920. The processor 1910 can invoke and execute computer programs stored in the memory 1920 to implement the methods in the implementations of the disclosure.

The memory 1920 may be a separate device from the processor 1910, or be integrated into the processor 1910.

Optionally, the apparatus 1900 may further include an input interface 1930. The processor 1910 can control the input interface 1930 to communicate with other devices or chips. Specifically, the input interface 1930 can obtain information or data transmitted by other devices or chips.

Optionally, the apparatus 1900 may further include an output interface 1940. The processor 1910 can control the output interface 1940 to communicate with other devices or chips. Specifically, the output interface 1940 can output information or data to other devices or chips.

Optionally, the apparatus can be applied to the network device in the implementations of the disclosure, and the apparatus can implement a corresponding process implemented by the network device in each of the methods in the implementations of the disclosure, which will not be repeated herein for the sake of simplicity.

Optionally, the apparatus can be applied to the terminal device in the implementations of the disclosure, and the apparatus can implement a corresponding process implemented by the terminal device in each of the methods in the implementations of the disclosure, which will not be repeated herein for the sake of simplicity.

Optionally, the apparatus mentioned in the implementations of the disclosure may also be a chip such as a system-level chip, a system chip, a chip system, a system-on-a-chip chip, or the like.

Figure 20:
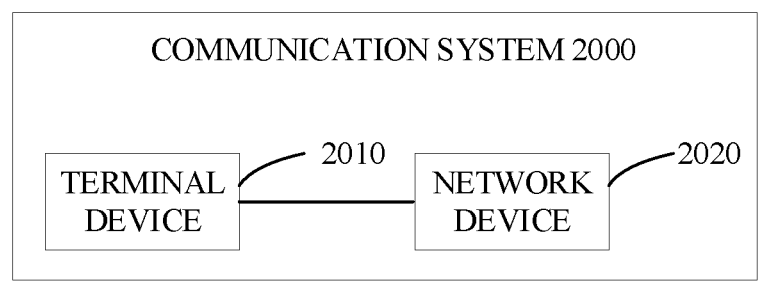
FIG. 20 is a schematic block diagram illustrating a communication system 2000 provided in implementations of the disclosure.

FIG. 20 is a schematic block diagram illustrating a communication system 2000 provided in implementations of the disclosure. As illustrated in FIG. 20, the communication system 2000 includes a terminal device 2010 and a network device 2020.

The terminal device 2010 can be configured to implement a corresponding function implemented by the terminal device in the foregoing methods, and the network device 2020 can be configured to implement a corresponding function implemented by the network device or the base station in the foregoing methods, which will not be repeated herein for the sake of simplicity.

It can be understood that, the processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like. The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM,) or an electrically erasable programmable memory, registers, and the like. The storage medium is located in the memory. The processor reads the information in the memory, and completes the steps of the above-mentioned method with the hardware thereof.

It can be understood that, in implementations of the disclosure, the memory may be a volatile memory or a non-volatile memory, or may include both the volatile memory and the non-volatile memory. The non-volatile memory may be an ROM, a PROM, an erasable programmable read-only memory (EPROM), an electrically erasable programmable read-only memory (EEPROM), or a flash memory. The volatile memory can be an RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

It can be understood that, the above-mentioned memory is an example but not limitation. For example, the memory may be an SRAM, a DRAM, an SDRAM, a DDRSDRAM, an ESDRAM, an SLDRAM, and a DRRAM. That is to say, the memory described herein is intended to include, but is not limited to, these and any other suitable types of memory.

A computer-readable storage medium is further provided in implementations of the disclosure. The computer-readable storage medium is configured to store computer programs.

Optionally, the computer-readable storage medium may be applied to the network device or the base station in implementations of the disclosure, and the computer programs enable a computer to perform a corresponding process implemented by the network device or the base station in each of the methods in implementations of the disclosure, which will not be repeated herein for the sake of simplicity.

Optionally, the computer-readable storage medium may be applied to the mobile terminal/terminal device in implementations of the disclosure, and the computer programs enable a computer to perform a corresponding process implemented by the mobile terminal/terminal device in each of methods in implementations of the disclosure, which will not be repeated herein for the sake of simplicity.

A computer program product is further provided in implementations of the disclosure. The computer program product includes computer program instructions.

Optionally, the computer program product may be applied to the network device or the base station in implementations of the disclosure, and the computer programs enable a computer to perform a corresponding process implemented by the network device or the base station in each of the methods in implementations of the disclosure, which will not be repeated herein for the sake of simplicity.

Optionally, the computer program product may be applied to the mobile terminal/terminal device in implementations of the disclosure, and the computer programs enable a computer to perform a corresponding process implemented by the mobile terminal/terminal device in each of methods in implementations of the disclosure, which will not be repeated herein for the sake of simplicity.

A computer program is further provided in implementations of the disclosure.

Optionally, the computer program may be applied to the network device or the base station in implementations of the disclosure, and the computer program, when running on a computer, enables the computer to perform a corresponding process implemented by the network device or the base station in each of the methods in implementations of the disclosure, which will not be repeated herein for the sake of simplicity.

Optionally, the computer program may be applied to the mobile terminal/terminal device in implementations of the disclosure, and the computer program, when running on a computer, enables the computer to perform a corresponding process implemented by the mobile terminal/terminal device in each of the methods in implementations of the disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, an ROM, an RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for wireless communication, comprising:
obtaining, by a terminal device, configuration information transmitted by a network device, the configuration information being used to configure a plurality of transmission resources for the terminal device, the plurality of transmission resources comprising a plurality of sidelink (SL) transmission resources, and the SL transmission resources being used for physical sidelink shared channel (PSSCH) transmission; and
determining, by the terminal device, whether to perform SL transmission on part of the plurality of SL transmission resources according to a time interval between the plurality of transmission resources;
wherein determining, by the terminal device, whether to perform the SL transmission on the part of the plurality of SL transmission resources according to the time interval between the plurality of transmission resources comprises:
- if a time interval between at least one set of two adjacent SL transmission resources in the plurality of SL transmission resources is less than a first threshold, determining, by the terminal device, to perform the SL transmission on the part of the plurality of SL transmission resources; or
- if at least one set of two adjacent SL transmission resources in the plurality of SL transmission resources satisfies a first condition, determining, by the terminal device, to perform the SL transmission on the part of the plurality of SL transmission resources; wherein for any one set of two adjacent SL transmission resources in the at least one set of two adjacent SL transmission resources, two adjacent SL transmission resources satisfying the first condition comprises: a start position of a second SL transmission resource in the two adjacent SL transmission resources being before a position that is a second threshold plus an end position of an SL feedback resource, wherein the SL feedback resource corresponds to a first SL transmission resource in the two adjacent SL transmission resources and is used for physical sidelink feedback channel (PSFCH) transmission.

2. The method of claim 1, wherein the first threshold is determined according to a first time interval and a second time interval, wherein the first time interval is determined according to a time interval between a first SL transmission resource in the two adjacent SL transmission resources and an SL feedback resource corresponding to the first SL transmission resource, and the second time interval is determined according to a time when the terminal device receives and processes a PSFCH.

3. The method of claim 1, wherein the first threshold is preconfigured, configured by a network, or predefined by an agreement.

4. The method of claim 1, wherein the second threshold is preconfigured, configured by a network, or predefined by an agreement.

5. The method of claim 1, wherein the part of the plurality of SL transmission resources comprises at least two SL transmission resources in the plurality of SL transmission resources, wherein a time interval between any two adjacent SL transmission resources in the at least two SL transmission resources is greater than or equal to the first threshold, and/or, a time interval between a last SL feedback resource corresponding to the at least two SL transmission resources and a UL transmission resource is greater than or equal to a third threshold.

6. A method for wireless communication, comprising:
transmitting, by a network device, configuration information to a terminal device, the configuration information being used to configure a plurality of transmission resources for the terminal device, the plurality of transmission resources comprising a plurality of sidelink (SL) transmission resources, the SL transmission resources being used for physical sidelink shared channel (PSSCH) transmission, and a time interval between the plurality of transmission resources being used by the terminal device to determine whether to perform SL transmission on part of the plurality of SL transmission resources;

wherein:
- if a time interval between at least one set of two adjacent SL transmission resources in the plurality of SL transmission resources is less than a first threshold, the SL transmission on the part of the plurality of SL transmission resources is determined to be performed; or
- if at least one set of two adjacent SL transmission resources in the plurality of SL transmission resources satisfies a first condition, the SL transmission on the part of the plurality of SL transmission resources is determined to be performed; wherein for any one set of two adjacent SL transmission resources in the at least one set of two adjacent SL transmission resources, two adjacent SL transmission resources satisfying the first condition comprises: a start position of a second SL transmission resource in the two adjacent SL transmission resources being before a position that is a second threshold plus an end position of an SL feedback resource, wherein the SL feedback resource corresponds to a first SL transmission resource in the two adjacent SL transmission resources and is used for physical sidelink feedback channel (PSFCH) transmission.

7. The method of claim 6, wherein the first threshold is determined according to a first time interval and a second time interval, wherein the first time interval is determined according to a time interval between a first SL transmission resource in the two adjacent SL transmission resources and an SL feedback resource corresponding to the first SL transmission resource, and the second time interval is determined according to a time when the terminal device receives and processes a PSFCH.

8. The method of claim 6, wherein the first threshold is preconfigured, configured by a network, or predefined by an agreement.

9. The method of claim 6, wherein the second threshold is preconfigured, configured by a network, or protocol predefined by an agreement.

10. The method of claim 6, wherein the part of the plurality of SL transmission resources comprises at least two SL transmission resources in the plurality of SL transmission resources, wherein a time interval between any two adjacent SL transmission resources in the at least two SL transmission resources is greater than or equal to the first threshold, and/or, a time interval between a last SL feedback resource corresponding to the at least two SL transmission resources and a UL transmission resource is greater than or equal to a third threshold.

11. A terminal device, comprising:
a transceiver;
a processor; and
a memory storing computer programs which, when executed by the processor, cause the transceiver to:
obtain configuration information transmitted by a network device, the configuration information being used to configure a plurality of transmission resources for the terminal device, the plurality of transmission resources comprising a plurality of sidelink (SL) transmission resources, and the SL transmission resources being used for physical sidelink shared channel (PSSCH) transmission;
wherein the computer programs being further executed by the processor cause the processor to:

determine whether to perform SL transmission on part of the plurality of SL transmission resources according to a time interval between the plurality of transmission resources;

wherein determining whether to perform the SL transmission comprises:
  determining to perform the SL transmission on the part of the plurality of SL transmission resources, if a time interval between at least one set of two adjacent SL transmission resources in the plurality of SL transmission resources is less than a first threshold; or
  determining to perform the SL transmission on the part of the plurality of SL transmission resources, if at least one set of two adjacent SL transmission resources in the plurality of SL transmission resources satisfies a first condition; wherein for any one set of two adjacent SL transmission resources in the at least one set of two adjacent SL transmission resources, two adjacent SL transmission resources satisfying the first condition comprises: a start position of a second SL transmission resource in the two adjacent SL transmission resources being before a position that is a second threshold plus an end position of an SL feedback resource, wherein the SL feedback resource corresponds to a first SL transmission resource in the two adjacent SL transmission resources and is used for physical sidelink feedback channel (PSFCH) transmission.

12. The terminal device of claim 11, wherein the first threshold is determined according to a first time interval and a second time interval, wherein the first time interval is determined according to a time interval between a first SL transmission resource in the two adjacent SL transmission resources and an SL feedback resource corresponding to the first SL transmission resource, and the second time interval is determined according to a time when the terminal device receives and processes a PSFCH.

13. The terminal device of claim 11, wherein the first threshold is preconfigured, configured by a network, or predefined by an agreement.

14. The terminal device of claim 11, wherein the part of the plurality of SL transmission resources comprises at least two SL transmission resources in the plurality of SL transmission resources, wherein a time interval between any two adjacent SL transmission resources in the at least two SL transmission resources is greater than or equal to the first threshold, and/or, a time interval between a last SL feedback resource corresponding to the at least two SL transmission resources and the UL transmission resource is greater than or equal to a third threshold.

* * * * *